US012352202B2

(12) United States Patent
Sakota et al.

(10) Patent No.: US 12,352,202 B2
(45) Date of Patent: Jul. 8, 2025

(54) ELECTRIC TURBOCHARGER WITH COOLING FLOW PATH

(71) Applicant: IHI Corporation, Tokyo (JP)

(72) Inventors: Koji Sakota, Tokyo (JP); Yuji Sasaki, Tokyo (JP); Shun Nakayama, Tokyo (JP)

(*) Notice: Subject to any disclaimer, the term of this patent is extended or adjusted under 35 U.S.C. 154(b) by 54 days.

(21) Appl. No.: 18/171,659

(22) Filed: Feb. 21, 2023

(65) Prior Publication Data
US 2023/0279873 A1    Sep. 7, 2023

Related U.S. Application Data

(63) Continuation of application No. PCT/JP2021/029182, filed on Aug. 5, 2021.

(30) Foreign Application Priority Data

Aug. 24, 2020 (JP) .................. 2020-140746

(51) Int. Cl.
F02B 39/00 (2006.01)
F02B 39/10 (2006.01)
(Continued)

(52) U.S. Cl.
CPC ............ F02B 39/005 (2013.01); F02B 39/10 (2013.01); F04D 29/284 (2013.01); F04D 29/441 (2013.01); H02K 9/227 (2021.01); F02B 2039/164 (2013.01); F04D 17/10 (2013.01); F04D 25/0606 (2013.01);
(Continued)

(58) Field of Classification Search
CPC ...... F04D 29/582; F04D 25/06; F04D 29/284; F04D 29/441; F04D 17/10; F04D 25/0606; F04D 25/082; F04D 29/5806; F04D 29/5853; F02B 39/005; F02B 39/10; F02B 2039/164; H02K 9/227
See application file for complete search history.

(56) References Cited

U.S. PATENT DOCUMENTS 3,060,335 A * 10/1962 Greenwald ............ H02K 5/203
                                                  310/58
7,530,230 B2    5/2009 Shibui et al.
2007/0169747 A1 7/2007 Shimizu
(Continued)

FOREIGN PATENT DOCUMENTS

JP    2007-040255    2/2007
JP    2007-224899    9/2007
(Continued)

OTHER PUBLICATIONS

Polymaker.com; PolyMide™ PA6-CF—Polymaker; from web.archive.org/web/20200513142135/https://polymaker.com/product/polymide-pa6-cf/ which is a screenshot of polymaker.com/product/polymide-pa6-cf/ from May 13, 2020 (Year: 2020).*

(Continued)

Primary Examiner — David N Brandt
(74) Attorney, Agent, or Firm — SOEI PATENT & LAW FIRM

(57) ABSTRACT

An electric turbocharger includes a motor including a stator, and a diffuser plate thermally coupled to an end surface of the stator to transfer heat from the stator to the diffuser plate. The diffuser plate forming a cooling flow path to circulate a cooling medium.

17 Claims, 3 Drawing Sheets

(51) Int. Cl.
  *F02B 39/16*  (2006.01)
  *F04D 17/10*  (2006.01)
  *F04D 25/06*  (2006.01)
  *F04D 25/08*  (2006.01)
  *F04D 29/28*  (2006.01)
  *F04D 29/44*  (2006.01)
  *F04D 29/58*  (2006.01)
  *H02K 9/22*  (2006.01)

(52) U.S. Cl.
  CPC ........ *F04D 25/082* (2013.01); *F04D 29/5806* (2013.01); *F04D 29/5853* (2013.01)

(56) References Cited

U.S. PATENT DOCUMENTS

| | | | |
|---|---|---|---|
| 2015/0337850 A1* | 11/2015 | An | F04D 29/284 |
| | | | 417/423.13 |
| 2017/0152792 A1* | 6/2017 | Hornbach | F04D 29/701 |
| 2018/0216633 A1 | 8/2018 | Makino et al. | |
| 2021/0293253 A1* | 9/2021 | Chavez Castellanos | |
| | | | F04D 29/5806 |

FOREIGN PATENT DOCUMENTS

| | | |
|---|---|---|
| JP | 2010-196478 | 9/2010 |
| JP | 2017-150339 | 8/2017 |
| WO | 2014/080501 | 5/2014 |
| WO | 2019/139199 | 7/2019 |

OTHER PUBLICATIONS

Professionalplastics.com; Thermal Properties of Plastic Materials; from professionalplastics.com/professionalplastics/ThermalPropertiesofPlasticMaterials.pdf?srsltid=AfmBOoqbqc1GEnJ382MTjelWOnOKh7Kmpbqkl11H_28Mo8dx96Gh_jpg (Year: 2024).*

Matweb.com; Aluminum Alloys, General; from matweb.com/search/datasheet.aspx?bassnum=MA0001&ckck=1 (Year: 2024).*

International Search Report dated Sep. 21, 2021 for PCT/JP2021/029182.

International Preliminary Report on Patentability with Written Opinion dated Mar. 9, 2023 for PCT/JP2021/029182.

* cited by examiner

ELECTRIC TURBOCHARGER WITH COOLING FLOW PATH

CROSS-REFERENCE TO RELATED APPLICATIONS

This application is a continuation application of PCT Application No. PCT/JP2021/029182, filed on Aug. 5, 2021, which claims the benefit of priority from Japanese Patent Application No. 2020-140746, filed on Aug. 24, 2020 the entire contents of which are incorporated herein by reference.

BACKGROUND

A supercharger receives heat from compressed air. The supercharger includes a motor that rotates an impeller, and the motor is also a heat source. When temperatures of components forming the supercharger are increased by heat from the compressed air and from the motor, the performance of the supercharger may be affected. As disclosed in Japanese Unexamined Patent Publication No. 2010-196478 and Japanese Unexamined Patent Publication No. 2017-150339, the supercharger may have a cooling structure for cooling the components. The cooling structure of Japanese Unexamined Patent Publication No. 2010-196478 is intended to cool the motor and the impeller. The cooling structure of Japanese Unexamined Patent Publication No. 2017-150339 is intended to cool the impeller.

SUMMARY

An example electric turbocharger may include a motor including a stator, and a diffuser plate thermally coupled (or thermally connected) to an end surface of the stator. The diffuser plate has a flow path through which a cooling medium (or heat transfer medium) is circulated.

DETAILED DESCRIPTION

Figure 1:
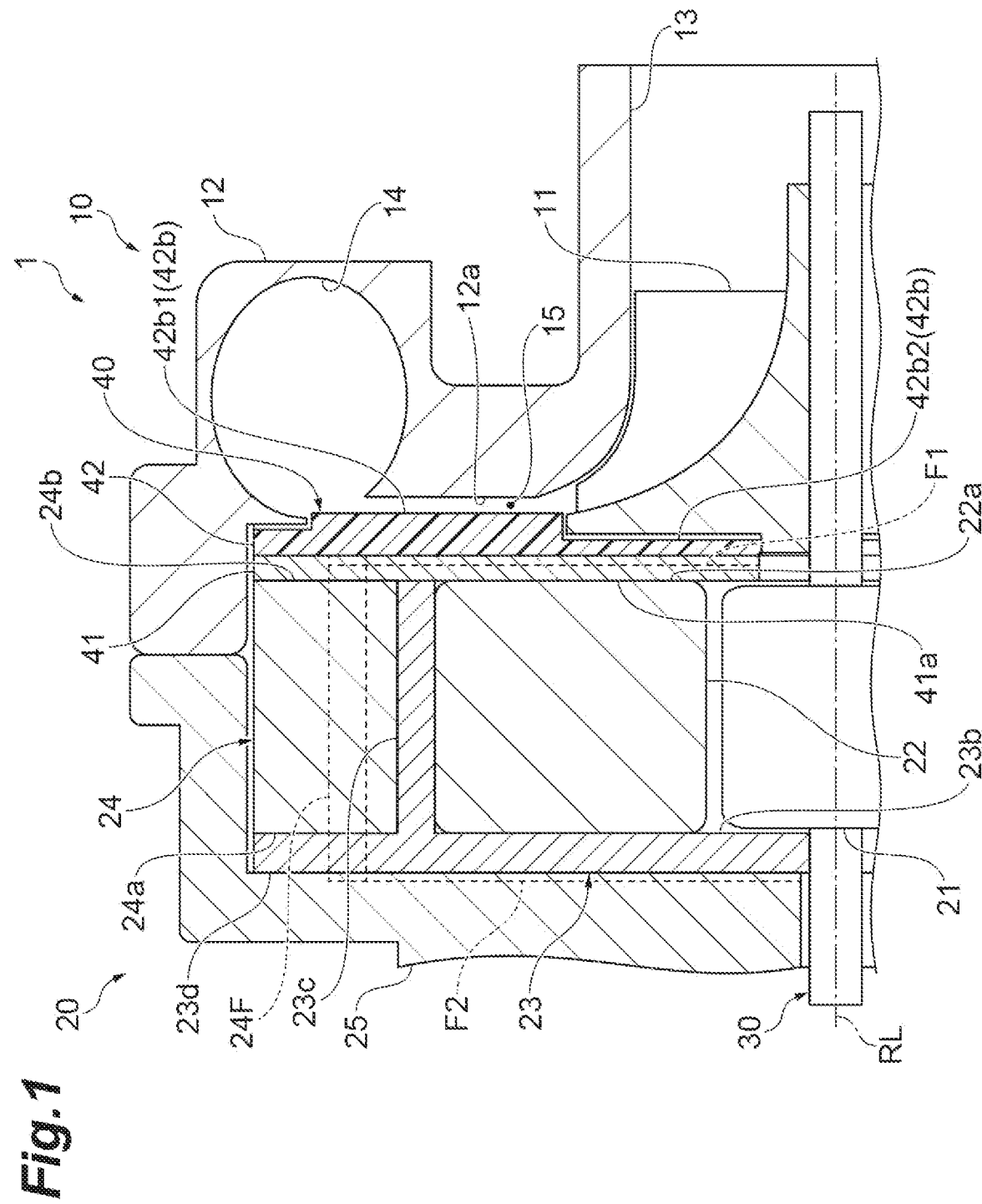
FIG. 1 is a schematic cross-sectional view illustrating an example configuration of an electric turbocharger.

An example electric turbocharger may include a motor including a stator, and a diffuser plate thermally coupled (or thermally connected) to an end surface of the stator. The diffuser plate has a flow path through which a heat transfer medium is circulated.

Thermal resistance from a heat generation location inside the stator to the end surface of the stator is relatively low. Therefore, heat can be more efficiently removed from the stator by thermally connecting (e.g., via a thermal coupling) the diffuser plate to the end surface of the stator and by circulating the heat transfer medium (or cooling medium) through the flow path of the diffuser plate. Therefore, cooling efficiency can be further improved.

The electric turbocharger of the present disclosure may further include an impeller to be rotated by a rotary shaft attached to the motor, and a compressor casing that accommodates the impeller, and that has a scroll flow path surrounding the impeller. The diffuser plate may have a disk shape and have a first end surface and a second end surface. The first end surface may be thermally connected to the end surface of the stator. In cooperation with the compressor casing, the second end surface may form a diffuser flow path that guides a fluid discharged from the impeller, from the impeller to the scroll flow path. Even with such a configuration, good cooling efficiency can be obtained.

In this example electric turbocharger, the diffuser plate may include a first plate member including the first end surface, and a second plate member including the second end surface. A thermal conductivity of the first plate member may be different from a thermal conductivity of the second plate member. According to this configuration, heat can be transferred to the heat transfer medium from a first plate member side having a relatively high thermal conductivity. Therefore, the stator can be more efficiently cooled.

In some examples, the electric turbocharger, the thermal conductivity of the first plate member may be greater than the thermal conductivity of the second plate member. According to this configuration, heat can be more efficiently transferred to the heat transfer medium from the first plate member side having a relatively high thermal conductivity. Therefore, the stator can be more efficiently cooled.

In some examples, the electric turbocharger, a temperature received by the first plate member may be lower than a temperature received by the second plate member. Even in this aspect, in the electric turbocharger, heat can be more efficiently removed from the stator, so as to cool the stator more efficiently.

Hereinafter, with reference to the drawings, the same elements or similar elements having the same function are denoted by the same reference numerals, and redundant description will be omitted.

FIG. 1 is a cross-sectional view of an electric turbocharger 1 of the present disclosure. As shown in FIG. 1, the electric turbocharger 1 includes a compressor 10 and a motor 20. The electric turbocharger 1 drives the compressor 10 through the motor 20 that uses electric power as a power source. The compressor 10 receives power from the motor via a rotary shaft 30. The electric turbocharger 1 discharges compressed air.

The compressor 10 includes an impeller 11 and a compressor casing 12. The compressor casing 12 has a suction port 13 and a scroll flow path 14. The suction port 13 is an opening portion that is coaxial with the rotary shaft 30. The scroll flow path 14 surrounds a rotary axis RL. The impeller 11 is disposed on a far side of the suction port 13. The scroll flow path 14 surrounds the impeller 11. According to this disposition, air suctioned from the suction port 13 reaches the scroll flow path 14 via the impeller 11. A diffuser flow path 15 is formed between the impeller 11 and the scroll flow path 14. The diffuser flow path 15 receives air from the impeller 11. The diffuser flow path 15 passes the received air to the scroll flow path 14. The diffuser flow path 15 is formed by a casing wall surface 12a of the compressor casing 12 and the diffuser plate 40 to be described later.

The motor 20 includes a rotor 21 and a stator 22. The rotor 21 is fixed to the rotary shaft 30. The rotor 21 rotates together with the rotary shaft 30. The rotor 21 includes, for example, a plurality of permanent magnets. The stator 22 is a member provided to surround the rotor 21. The stator 22 includes a coil.

The motor 20 further includes a stator casing 23, a pass block 24, and a motor casing 25. The stator casing 23 accommodates the stator 22 and the rotor 21. The stator casing 23 has a cylindrical shape. The stator 22 is fixed inside the stator casing 23. One end of the stator casing 23 forms a casing opening 23a (refer to FIG. 2). The other end of the stator casing 23 is closed by a casing end surface 23b. The casing end surface 23b forms a back surface-side cooling flow path F2 in cooperation with the motor casing 25 to be described later.

Figure 2:
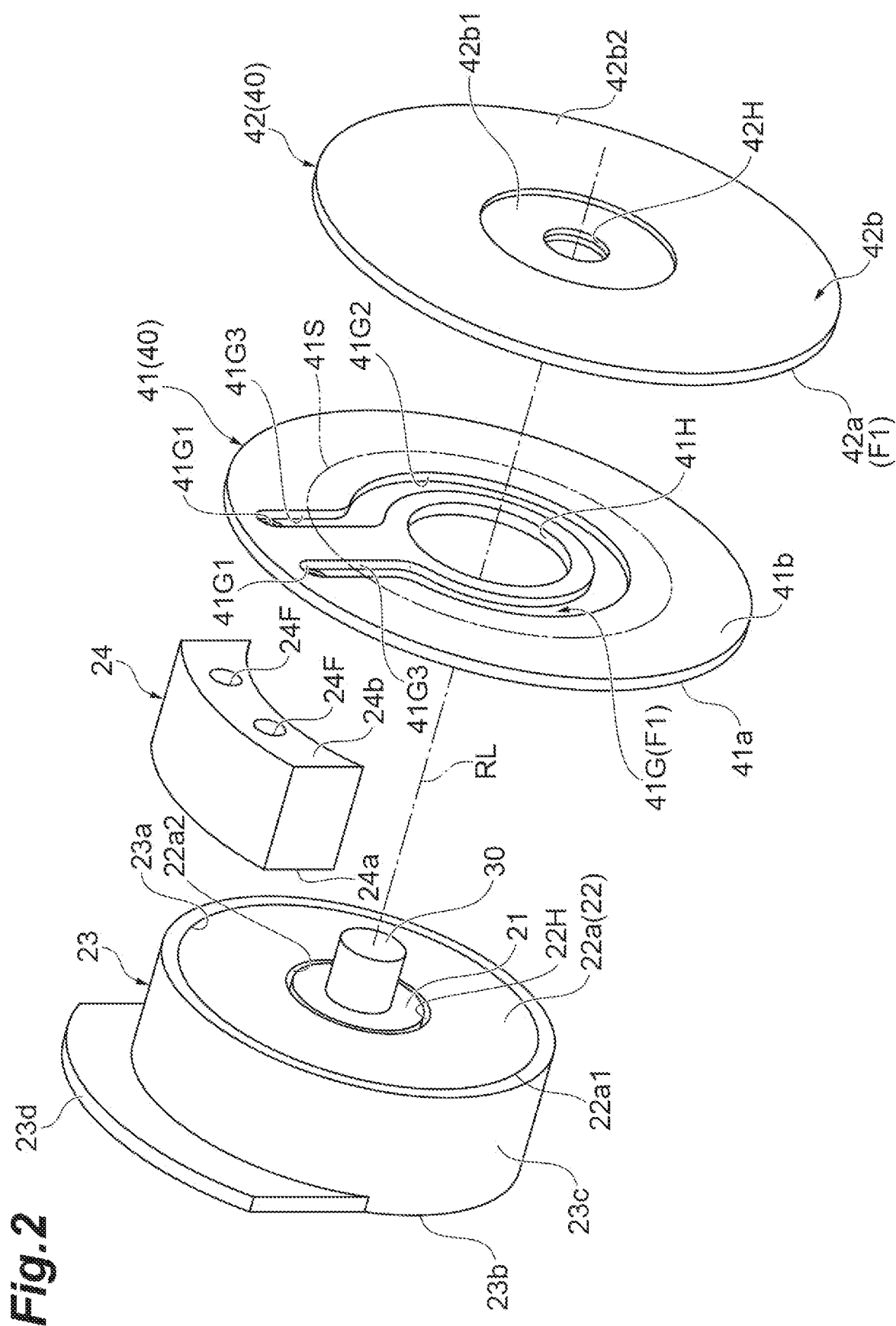
FIG. 2 is an exploded perspective view illustrating a stator, a stator casing, and a diffuser plate of the example electric turbocharger of FIG. 1.

As shown in FIG. 2, a casing rib 23d is provided on a casing outer peripheral surface 23c of the stator casing 23. The pass block 24 is attached to the casing rib 23d. The pass block 24 is a component separate from the stator casing 23. The pass block 24 has a block back surface 24a and a block main surface 24b. The block back surface 24a abuts the casing rib 23d. The block main surface 24b abuts the diffuser plate 40. The pass block 24 has connection flow paths 24F. The connection flow paths 24F are holes penetrating therethrough from the block back surface 24a to the block main surface 24b. The connection flow paths 24F connect the back surface-side cooling flow path F2 to a main surface-side cooling flow path F1 of the diffuser plate 40 to be described later.

The casing opening 23a is closed by the diffuser plate 40. As described above, the diffuser plate 40 forms the diffuser flow path 15 in cooperation with the compressor casing 12. For example, the diffuser flow path 15 is formed between the diffuser plate 40 and the compressor casing 12. Namely, the diffuser plate 40 partitions the compressor 10 and the motor 20 off from each other. The diffuser plate 40 includes a motor-side disk 41 (first plate member) and a compressor-side disk 42 (second plate member). The motor-side disk 41 is a circular thin plate in a plan view. The motor-side disk 41 is a circular thin plate when viewed from a rotary axis RL direction. The compressor-side disk 42 is a circular thin plate in a plan view. The compressor-side disk 42 is also a circular thin plate when viewed from the rotary axis RL direction. A main surface of the motor-side disk 41 abuts a back surface of the compressor-side disk 42, thereby forming the diffuser plate 40. The motor-side disk 41 has a motor-side hole 41H that is a through hole. The compressor-side disk 42 also has a compressor-side hole 42H that is a through hole. Centers of the motor-side hole 41H and of the compressor-side hole 42H coincide with the rotary axis RL. The motor-side hole 41H and the compressor-side hole 42H are coaxial with each other.

A material forming the motor-side disk 41 is different from a material forming the compressor-side disk 42. A thermal conductivity of the material forming the motor-side disk 41 is different from a thermal conductivity of the material forming the compressor-side disk 42. The thermal conductivity of the motor-side disk 41 is greater than the thermal conductivity of the compressor-side disk 42. For example, a metal material such as an aluminum alloy may be employed as the material forming the motor-side disk 41. A heat-resistant resin material such as poly phenylene sulfide resin or phenolic resin may be employed as the material forming the compressor-side disk 42.

When materials having different thermal conductivities are selected, a bias can be generated between heat transfer from the motor 20 to the diffuser plate 40 and heat transfer from the compressor 10 to the diffuser plate 40. The diffuser plate 40 actively receives heat from the motor-side disk 41 having a relatively high thermal conductivity. When a resin material having a low thermal conductivity is selected, heat transfer within the diffuser plate 40 from a compressor 10 side to a motor side can be suppressed.

The motor-side disk 41 has a motor-side back surface 41a (first end surface) that faces the motor and a motor-side main surface 41b that faces the compressor. The motor-side back surface 41a also is in contact with the motor 20. The motor-side back surface 41a abuts the pass block 24. The motor-side back surface 41a is also connected to a stator main surface 22a of the stator 22 accommodated in the stator casing 23.

"Connection" referred to here means "thermally connected" or "thermally coupled". In some examples, the term "thermally connected" (or "thermally coupled") may refer to a configuration in which a gap is formed between the motor-side back surface 41a and the stator main surface 22a. For example, a state where thermal resistance from the motor-side back surface 41a to the stator main surface 22a is less than thermal resistance in a state where the gap is filled with air may be defined as "thermally connected" (or "thermally coupled"). An example of "thermally connected" is a state where the motor-side back surface 41a is in physical contact with the stator main surface 22a. In a state where the stator main surface 22a and the motor-side back surface 41a are in physical contact with each other, a substantial air layer that affects heat transfer is not formed therebetween. Therefore, heat may be better transferred from the stator main surface 22a to the motor-side back surface 41a. Another example of "thermally connected" is a state where a gap exists between the stator main surface 22a and the motor-side back surface 41a but the gap is filled with a thermally conductive material such as heat-transfer grease. Since the thermally conductive material has a greater thermal conductivity than that of air, heat is better transferred from the stator main surface 22a to the motor-side back surface 41a.

A flow path groove 41G is formed in the motor-side main surface 41b. The flow path groove 41G is a depression that is dug in the motor-side main surface 41b. The flow path groove 41G includes two through holes 41G1, an annular groove portion 41G2, and two connection groove portions 41G3. The through holes 41G1 which form an inlet and outlet, penetrate through the motor-side disk 41 from the motor-side main surface 41b to the motor-side back surface 41a. A first connection groove portions 41G3 links a first end 41Gc of the annular groove portion 41G2 to a first through hole 41G1 and a second connection groove portions 41G3 links a second end 41Gd of the annular groove portion 41G2 to a second through hole 41G1. The through holes 41G1 are connected to the respective connection flow paths 24F of the pass block 24 on the motor-side back surface 41a. Therefore, the motor-side back surface 41a is connected to the pass block 24 in a watertight manner.

Figure 3:
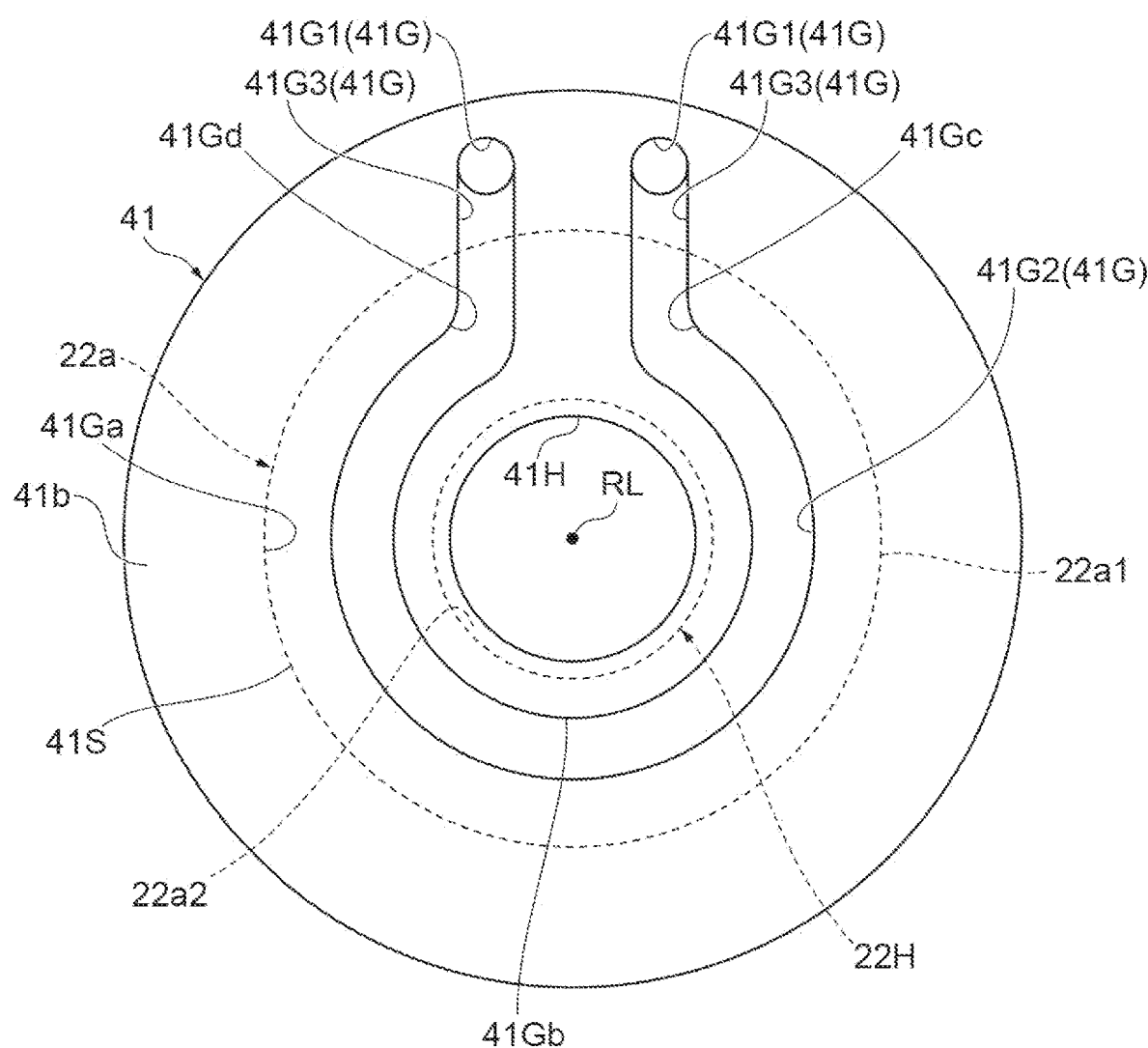
FIG. 3 is a schematic front view illustrating a first plate of the diffuser plate of FIG. 2 overlapping the example stator.

As shown in FIG. 3, the annular groove portion 41G2 has an annular shape surrounding the rotary axis RL. The annular groove portion 41G2 may overlap the stator main surface 22a in a plan view orthogonal to the rotary axis RL direction. For example, the diffuser plate may include an overlapping region 41S that overlaps the end surface of the stator in a transverse direction that is orthogonal to the axial direction RL, with the annular groove portion 41G2 extending within the overlapping region 41S. In some examples, the entirety of the annular groove portion 41G2 may overlap the stator main surface 22a, or a part of the annular groove portion 41G2 may overlap the stator main surface 22a. An aspect in which the annular groove portion 41G2 overlaps the stator main surface 22a can be adjusted by a diameter of the annular groove portion 41G2. An aspect in which the annular groove portion 41G2 overlaps the stator main surface 22a can also be adjusted by a groove width of the annular groove portion 41G2. The annular groove portion 41G2 is formed with a central angle of 180 degrees or more around the rotary axis RL (e.g., a center axis of the motor-side hole 41H). For example, the annular groove portion 41G2 may extend along a substantially circular arc around the motor-side hole 41H, that forms an angle of 180 degrees or more around the center axis of the motor-side hole 41H. This angle may be set according to a position of each of the connection flow paths 24F of the pass block 24. In some examples, the annular groove portion 41G2 has an outer wall 41Ga located radially inwardly relative to an outer circumferential wall 22a1 of the stator, and an inner wall 41Gb located radially outwardly relative to an inner circumferential wall 22a2 of the stator formed by a through hole 22H of the stator 22 to accommodate the rotor 21.

When positions of the through holes 41G1 that are portions to be connected with the respective connection flow paths 24F are outside the annular groove portion 41G2, the connection groove portions 41G3 that connect the through holes 41G1 to the annular groove portion 41G2 are provided. The connection groove portions 41G3 may be provided as necessary depending on a positional relationship between the annular groove portion 41G2 and the through holes 41G1. For example, when the through holes 41G1 overlap the annular groove portion 41G2, the connection groove portions 41G3 may be omitted.

As shown in FIG. 2 again, the compressor-side disk 42 has a compressor-side back surface 42a and a compressor-side main surface 42b (second end surface). The compressor-side back surface 42a abuts the motor-side main surface 41b. The compressor-side back surface 42a closes opening portions of the through holes 41G1, of the annular groove portion 41G2, and of the connection groove portions 41G3 formed in the motor-side main surface 41b. Therefore, the compressor-side main surface 42b forms the main surface-side cooling flow path F1 in cooperation with the through holes 41G1, with the annular groove portion 41G2, and with the connection groove portions 41G3. The compressor-side main surface 42b includes an impeller region 42b1 and a diffuser region 42b2. The impeller region 42b1 faces the impeller 11. The diffuser region 42b2 forms the diffuser flow path 15. The diffuser region 42b2 surrounds the impeller region 42b1.

The individual components provided in the electric turbocharger 1 have been described in detail. Next, a cooling mechanism provided in the electric turbocharger 1 will be described. The cooling mechanism cools the motor 20. A temperature rise of the motor 20 affects characteristics of the motor 20. When the temperature of the motor 20 rises too much, an output of the motor 20 tends to decrease. Therefore, the motor 20 is controlled such that the temperature does not exceed a temperature set in advance during operation of the motor 20. On the other hand, in the motor 20, an electric current is provided to the coil as a power source. When an electric current flows through the coil, heat is generated due to electric resistance. The electric current that flows increases as the output of the motor 20 increases, so that the degree of heat generation also increases. Further, when air is compressed in the compressor 10, the compressed air becomes hot. For example, the temperature of the compressed air reaches even 280 degrees Celsius or more. Namely, heat is generated due to various factors during operation of the electric turbocharger 1. Therefore, heat is actively discharged such that the heat does not cause the temperature of the motor 20 to exceed a set value. Therefore, the electric turbocharger 1 includes the cooling mechanism including the back surface-side cooling flow path F2 and the main surface-side cooling flow path F1.

A main heat generation source included in the motor 20 is the stator 22 including the coil. The coil of the stator 22 is wound around a component such as teeth. Gaps between turns of a conducting wire forming the coil are filled with a resin material. Accordingly, the above-described example cooling mechanism removes heat from the stator 22 more efficiently.

The cooling mechanism employs both end surfaces of the stator 22 as heat paths. The cooling mechanism sandwiches the stator 22 along the rotary axis RL. The back surface-side cooling flow path F2 is disposed on a stator back surface side. The back surface-side cooling flow path F2 is formed by the motor casing 25 and the stator casing 23. A groove forming the back surface-side cooling flow path F2 may be provided in the motor casing 25. The groove forming the back surface-side cooling flow path F2 may be provided in the stator casing 23. The main surface-side cooling flow path F1 is disposed on a stator main surface 22a side. The main surface-side cooling flow path F1 is formed by the diffuser plate 40. The main surface-side cooling flow path F1 and the back surface-side cooling flow path F2 are connected to each other by the pass block 24. The back surface-side cooling flow path F2, the main surface-side cooling flow path F1, and the connection flow paths 24F communicate with each other. The back surface-side cooling flow path F2, the main surface-side cooling flow path F1, and the connection flow paths 24F form one flow path.

The electric turbocharger 1 includes the motor 20 including the stator 22, and the diffuser plate 40 thermally connected to the stator main surface 22a. The diffuser plate 40 has the main surface-side cooling flow path F1 through which a heat transfer medium (or cooling medium) is circulated. The heat transfer medium (or cooling medium) may be a fluid or the like, to receive heat from the diffuser plate 40. Thermal resistance from a heat generation location in the stator 22 to the stator main surface 22a is relatively low. Therefore, heat can be more efficiently removed from the stator 22 by thermally connecting the diffuser plate 40 to the stator main surface 22a and by circulating the heat transfer medium through the main surface-side cooling flow path F1 of the diffuser plate 40. Therefore, cooling efficiency can be further improved.

The diffuser plate 40 has a disk shape. The diffuser plate 40 has the motor-side back surface 41a and the compressor-side main surface 42b. The motor-side back surface 41a is thermally connected to the stator main surface 22a. In cooperation with the compressor casing 12, the compressor-side main surface 42b forms the diffuser flow path 15 that guides a fluid discharged from the impeller 11, from the impeller 11 to the scroll flow path 14. In the electric turbocharger 1, the diffuser plate includes the motor-side disk 41 including the motor-side back surface 41a, and the compressor-side disk 42 including the compressor-side main surface 42b. The thermal conductivity of the motor-side disk 41 is different from the thermal conductivity of the compressor-side disk 42. The thermal conductivity of the motor-side disk 41 is greater than the thermal conductivity of the compressor-side disk 42. Further, in the electric turbocharger 1, a temperature received by the motor-side disk 41 is lower than a temperature received by the compressor-side disk 42.

A configuration has already been described in which a back surface side of the diffuser plate 40 is thermally connected to the motor 20, and a main surface side of the diffuser plate 40 forms the diffuser flow path 15.

During operation, a temperature on the motor 20 side of the diffuser may be lower than a temperature on the compressor 10 side. With reference to a temperature of the heat transfer medium flowing through the diffuser plate 40, a temperature difference between the temperature of the heat transfer medium and a temperature on the motor side is less than a temperature difference between the temperature of the heat transfer medium and a temperature on a diffuser flow path 15 side. The ease of heat transfer is proportional to a temperature difference. The greater the temperature difference is, the easier heat is transferred. With regard to a temperature relationship, heat transfer to the diffuser plate 40 is likely to be dominated by heat transfer from the compressor 10 side. As a result, the removal of heat from the motor 20 that is to be cooled may be insufficient, and there is a possibility that the stator 22 cannot be sufficiently cooled.

Therefore, the diffuser plate 40 of the example is made of materials having different thermal conductivities. Namely, the motor 20 side of the diffuser plate 40 may be formed of a material having a greater thermal conductivity than that of the material forming the compressor 10 side of the diffuser plate 40, in order to increase the heat transfer from the motor 20 to the diffuser plate 40 and to suppress the heat transfer from the compressor 10 to the diffuser plate 40. For example, material having a greater thermal conductivity than that of a material of a component on the compressor 10 side to which the inflow of heat is desired to be suppressed is employed for a component on the motor 20 side from which heat is desired to be actively removed. Conversely, a material having a lower thermal conductivity than that of a material of the component on the motor 20 side to which heat is desired to be actively removed is employed for the component on the compressor 10 side to which the inflow of heat is desired to be suppressed. A component having a relatively high thermal conductivity is disposed on a low temperature side, and a component having a low thermal conductivity is disposed on a higher temperature side. According to such a configuration, heat can be better transferred to the heat transfer medium from the motor 20 side on which the temperature is relatively low.

Components of the above-described example may be modified in any suitable way. For example, an example diffuser plate 40 may include a first plate 41 forming a first annular groove portion 41G, and a second plate 42 forming a second annular groove portion 41G. The two annular groove portions 41G are positioned to form an annular portion of a cooling flow path F1. Accordingly, the cooling flow path F1 extends within both the first plate 41 and the second plate 42. The cooling flow path F1 further includes two through holes 41G1 and two corresponding connection groove portions 41G3 to link two ends of the annular portion with the two through holes 41G1, respectively.

It is to be understood that not all aspects, advantages and features described herein may necessarily be achieved by, or included in, any one particular example. Indeed, having described and illustrated various examples herein, it should be apparent that other examples may be modified in arrangement and detail.

The invention claimed is:

1. An electric turbocharger comprising:
    a motor including a stator having a substantially cylindrical shape;
    an impeller that is rotatable via the motor;
    a compressor casing that accommodates the impeller, and that forms a scroll flow path surrounding the impeller; and
    a diffuser plate having a disk shape that includes a first plate member forming a first surface that is thermally coupled to an end surface of the stator, to transfer heat from the stator to the diffuser plate, and a second plate member forming a second surface that is opposite the first surface,
    wherein a thermal conductivity of the first plate member is different from a thermal conductivity of the second plate member,
    wherein the diffuser plate has a cooling flow path;
    wherein a diffuser flow path is formed between the second surface and the compressor casing to guide a fluid discharged from the impeller to the scroll flow path,
    wherein the diffuser plate forms an inlet hole for the cooling flow path and an outlet hole for the cooling flow path, that are located radially outwardly relative to an outer circumferential wall of the stator, and
    wherein the cooling flow path includes an annular portion that is fluidly coupled between the inlet hole and the outlet hole of the diffuser plate to direct a cooling medium from the inlet hole to the outlet hole via the annular portion.

2. The electric turbocharger according to claim 1, wherein the thermal conductivity of the first plate member is greater than the thermal conductivity of the second plate member.

3. The electric turbocharger according to claim 1,
    wherein the stator extends in an axial direction,
    wherein the first plate member of the diffuser plate is located adjacent to the end surface of the stator in the axial direction, and wherein the first plate member includes an overlapping region that overlaps the end surface of the stator in the axial direction, and
    wherein the cooling flow path is formed in the first plate member to extend at least partially within the overlapping region of the first plate member.

4. The electric turbocharger according to claim 3,
    wherein the stator forms a through hole extending in the axial direction, to accommodate a rotary shaft,
    wherein the diffuser plate has an annular disk shape forming a shaft hole to accommodate the rotary shaft,
    wherein the annular portion of the cooling flow path at least partially surrounds the shaft hole of the diffuser plate, and extends entirely within the overlapping region of the diffuser plate,
    wherein the annular portion of the cooling flow path has an outer wall and an inner wall,
    wherein the outer wall is located radially inwardly relative to the outer circumferential wall of the stator, and
    wherein the inner wall is located radially outwardly relative to an inner circumferential wall of the stator formed by the through hole.

5. The electric turbocharger according to claim 1, wherein the cooling flow path further includes:
    a first connecting portion extending substantially radially outwardly from a first end of the annular portion to the inlet hole; and
    a second connection portion extending substantially radially outwardly from a second end of the annular portion to the outlet hole.

6. The electric turbocharger according to claim 1, wherein the diffuser plate contacts the end surface of the stator.

7. The electric turbocharger according to claim 1, further comprising a thermally conductive material interposed between the end surface of the stator and the diffuser plate.

8. An electric turbocharger comprising:
    a motor including a stator having a substantially cylindrical shape that extends in an axial direction and that forms a through hole to accommodate a rotary shaft;
    a compressor including an impeller that is rotatable via the motor; and a diffuser plate disposed between the motor and the compressor, and located adjacent to the stator in the axial direction, to receive heat from the stator,
wherein the diffuser plate has an annular disk shape forming a shaft hole to accommodate the rotary shaft,
wherein the diffuser plate includes:
an overlapping region that overlaps the stator in the axial direction;
a compressor-side disk facing the compressor; and
a motor-side disk facing the motor,
wherein a thermal conductivity of a material forming the motor-side disk is greater than a thermal conductivity of a material forming the compressor-side disk,
wherein the diffuser plate has a cooling flow path to circulate a cooling medium, and
wherein the cooling flow path includes:
an inlet formed by a first through hole in the diffuser plate, wherein the first through hole is located radially outwardly relative to an outer circumferential wall of the stator;
an outlet formed by a second through hole in the diffuser plate, wherein the second through hole is located radially outwardly relative to the outer circumferential wall of the stator; and
an annular portion that at least partially surrounds the shafthole and that extends at least within the overlapping region of the diffuser plate, wherein the annular portion includes a first end connected to the inlet and a second end connected to the outlet.

9. The electric turbocharger according to claim 8,
wherein the material forming the compressor-side disk is a resin material, and
wherein the material forming the motor-side disk is a metal material.

10. The electric turbocharger according to claim 8,
wherein the cooling flow path is formed in the motor-side disk.

11. The electric turbocharger according to claim 8,
wherein the annular portion of the cooling flow path is formed entirely within the overlapping region of the diffuser plate,
wherein the annular portion of the cooling flow path has an outer wall and an inner wall,
wherein the outer wall is located radially inwardly relative to the outer circumferential wall of the stator, and
wherein the inner wall is located radially outwardly relative to an inner circumferential wall of the stator formed by the through hole of the stator.

12. The electric turbocharger according to claim 8, wherein the annular portion of the cooling flow path extends along a substantially circular arc around the shaft hole, that forms an angle of 180 degrees or more around a center axis of the shaft hole.

13. The electric turbocharger according to claim 11, wherein the cooling flow path further includes a first connection flow path to link the first end of the annular portion to the first through hole and a second connection flow path to link the second end of the annular portion to the second through hole.

14. An electric turbocharger comprising:
a motor including a stator;
a compressor including an impeller that is rotatable via the motor; and
a diffuser plate disposed between the motor and the compressor, including a compressor-side disk facing the compressor and a motor-side disk disposed adjacent to the stator of the motor, to receive heat from the stator,
wherein a thermal conductivity of a material forming the motor-side disk is greater than a thermal conductivity of a material forming the compressor-side disk, and
wherein the diffuser plate forms a cooling flow path including:
an annular portion extending substantially along a circular arc from a first end to a second end of the annular portion;
a first connecting portion extending substantially radially outwardly from the first end of the annular portion to an inlet hole formed in the diffuser plate; and
a second connection portion extending substantially radially outwardly from the second end of the annular portion to an outlet hole formed in the diffuser plate.

15. The electric turbocharger according to claim 14,
wherein the cooling flow path is formed in the motor-side disk of the diffuser plate.

16. The electric turbocharger according to claim 14,
wherein the stator has a substantially cylindrical shape, and
wherein the inlet hole and the outlet hole are located radially outwardly relative to an outer circumferential wall of the stator.

17. The electric turbocharger according to claim 16,
wherein the stator forms a through hole extending in an axial direction of the stator, to accommodate a rotary shaft,
wherein the diffuser plate has an annular disk shape forming a shaft hole to accommodate the rotary shaft,
wherein the diffuser plate includes an overlapping region that overlaps the stator in the axial direction,
wherein the annular portion of the cooling flow path substantially surrounds the shaft hole of the diffuser plate, and extends entirely within the overlapping region of the diffuser plate,
wherein the annular portion of the cooling flow path has an outer wall and an inner wall,
wherein the outer wall is located radially inwardly relative to the outer circumferential wall of the stator, and
wherein the inner wall is located radially outwardly relative to an inner circumferential wall of the stator formed by the through hole.

* * * * *